(12) United States Patent
Pitkow et al.

(10) Patent No.: US 10,402,832 B2
(45) Date of Patent: Sep. 3, 2019

(54) NETWORK INTERACTION CORRELATION

(75) Inventors: Jim Pitkow, San Francisco, CA (US); Raman Chelliah, San Carlos, CA (US); Marc Brown, Palo Alto, CA (US)

(73) Assignee: comScore, Inc., Reston, VA (US)

( * ) Notice: Subject to any disclaimer, the term of this patent is extended or adjusted under 35 U.S.C. 154(b) by 383 days.

(21) Appl. No.: 11/640,125

(22) Filed: Dec. 15, 2006

(65) Prior Publication Data
US 2008/0147499 A1 Jun. 19, 2008

(51) Int. Cl.
*G06Q 30/00* (2012.01)
*G06Q 30/02* (2012.01)

(52) U.S. Cl.
CPC ......... *G06Q 30/02* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 6,437,812 B1 | 8/2002 | Giles et al. | |
| 7,493,655 B2 | 2/2009 | Brown | |
| 7,657,626 B1 | 2/2010 | Zwicky | |
| 7,712,141 B1 * | 5/2010 | Agrawal et al. | 726/26 |
| 8,160,924 B2 | 4/2012 | Daniels et al. | |
| 8,321,269 B2 | 11/2012 | Linden et al. | |
| 8,554,804 B2 * | 10/2013 | Muret et al. | 707/803 |
| 8,572,733 B1 * | 10/2013 | Rockwood | 726/23 |

| | | |
|---|---|---|
| 2003/0105863 A1 | 6/2003 | Hegli et al. |
| 2003/0145233 A1 | 7/2003 | Poletto et al. |
| 2003/0195960 A1 | 10/2003 | Merriam |
| 2003/0225811 A1 | 12/2003 | Ali et al. |
| 2004/0117654 A1 | 6/2004 | Feldman et al. |
| 2004/0230476 A1 | 11/2004 | Messer |
| 2004/0254857 A1 | 12/2004 | Onizuka |
| 2006/0004633 A1 | 1/2006 | Ashbaugh |
| 2006/0026067 A1 | 2/2006 | Nicholas et al. |
| 2006/0069784 A2 | 3/2006 | Hsu et al. |
| 2006/0136294 A1 | 6/2006 | Linden et al. |
| 2006/0253578 A1 | 11/2006 | Dixon et al. |
| 2006/0259542 A1 | 11/2006 | Wu et al. |
| 2006/0265493 A1 | 11/2006 | Brindley et al. |
| 2007/0033106 A1 | 2/2007 | Mason |
| 2007/0061211 A1 | 3/2007 | Ramer et al. |

(Continued)

FOREIGN PATENT DOCUMENTS

WO WO 2005/053226 A1 6/2005

OTHER PUBLICATIONS

Binkley et al. "Ourmon and Network Monitoring Performance" FREENIX Track: 2005 USENIX Annual Technical Conference, 2005, pp. 95-108.

(Continued)

*Primary Examiner* — Alvin L Brown
(74) *Attorney, Agent, or Firm* — Baker & Hostetler LLP

(57) ABSTRACT

Correlating a network interaction is disclosed. A network interaction is detected at an advertising network. A network interaction is detected at an advertiser. The network interaction at the advertising network is correlated with the network interaction at the advertiser. The network interaction correlation is performed by a third party that is not affiliated with the advertising network or the advertiser.

20 Claims, 12 Drawing Sheets

(56) References Cited

U.S. PATENT DOCUMENTS

2007/0083519 A1     4/2007   Daniels et al.
2007/0192190 A1*   8/2007   Granville ........................ 705/14
2007/0244857 A1     10/2007   Yu
2007/0255821 A1*   11/2007   Ge et al. ........................ 709/224
2016/0300264 A1*   10/2016   Gross ..................... G06Q 30/02

OTHER PUBLICATIONS

Non-Final Office Action dated Jan. 6, 2015, U.S. Appl. No. 12/077,947, filed Mar. 21, 2008, pp. 1-22.
Final Office Action dated Aug. 17, 2015, U.S. Appl. No. 12/077,947, pp. 1-18.
Non-Final Office Action dated Sep. 11, 2015, U.S. Appl. No. 11/890,312, pp. 1-30.
Final Office Action dated Mar. 24, 2016, U.S. Appl. No. 11/890,312, pp. 1-24.
Non-Final Office Action dated Sep. 9, 2016, U.S. Appl. No. 12/077,947, pp. 1-26.
Final Office Action dated Mar. 24, 2017, U.S. Appl. No. 12/077,947, pp. 1-23.
Non-Final Office Action dated Apr. 7, 2017, U.S. Appl. No. 11/890,312, pp. 1-25.

\* cited by examiner

NETWORK INTERACTION CORRELATION

BACKGROUND OF THE INVENTION

Revenue for Internet companies is often driven by advertising, which is paid out based on the number of network interactions (e.g., a click) on an advertisement. However, sometimes network interactions are not legitimate—for example, a botnet may be developed to cause network interactions with an advertisement. Illegitimate network interactions lead to inappropriate payments by advertisers and inappropriate payments to publishers. It would be useful to be able to analyze network interactions to assess their legitimacy to reduce the amount of inappropriate payments.

BRIEF DESCRIPTION OF THE DRAWINGS

Various embodiments of the invention are disclosed in the following detailed description and the accompanying drawings.

DETAILED DESCRIPTION

Figure 1:
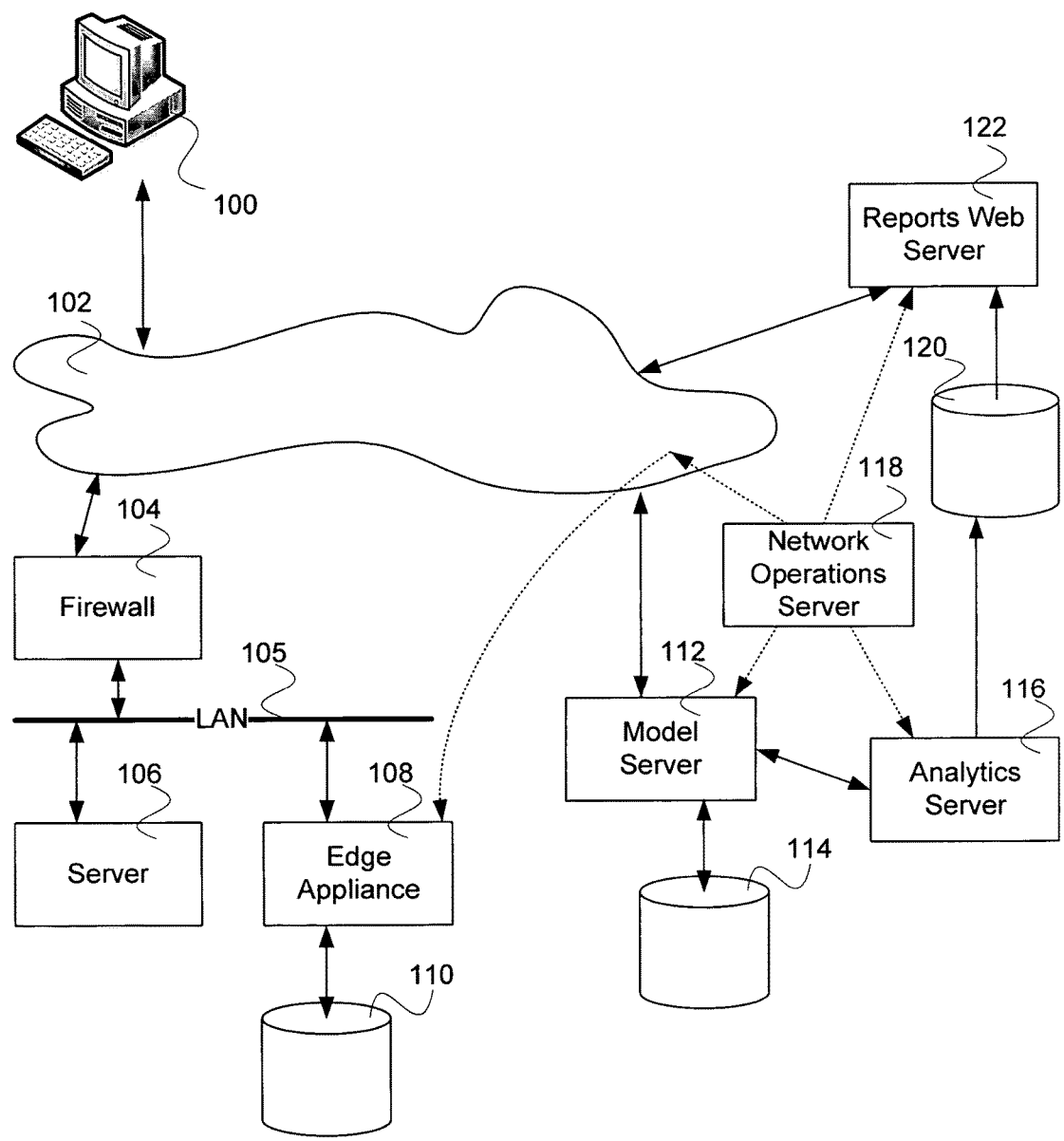
FIG. 1 is a block diagram illustrating an embodiment of a system for analyzing a network interaction.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analyzing a network interaction is disclosed. An appliance is used for analyzing a network interaction. The appliance includes an input to monitor network traffic without interfering with the network traffic. The network traffic includes a network interaction. The appliance includes a processor which analyzes the network traffic to derive information about the network interaction. The information about the network interaction is used to distinguish whether the network interaction is a qualified network interaction with a user. If the interaction is qualified, then the network interaction is legitimate and should qualify for a payment. For example, upon receiving a legitimate click, an advertiser should pay for the click and the publisher should be paid for the click.

In some embodiments, an appliance passively monitors network interactions for a web server. The server can be an advertising network's server, a publisher's server, an advertiser's server, an internet service provider's server, or any other appropriate server where network interactions can be monitored. The appliance derives its assessment information by monitoring the transmission control protocol (TCP) and/or internet protocol (IP) layer information of network interactions. For example, some of the information detected in real-time by the appliance hardware is information from Open Systems Interconnection (OSI) layers 3 through 7 that is associated with the network interaction. Ultimately, the assessment information is used to decide if the network interaction is qualified so that a payment is made by the advertiser and/or a payment is made to a publisher. An inference regarding legitimacy or fraudulence and rates or levels of legitimacy or fraudulence can then be reported. As an example, based on the assessment information, the appliance can ascertain that a network interaction has a common source or common routing information with other network interactions. If many network interactions aggregate at a point in the network (e.g., if the network interactions originate at a common source internet protocol address or are routed through a common network device such as a router that makes packets anonymous), it becomes a strong possibility that the network interactions are not legitimate.

In some embodiments, the network interaction monitoring is performed by a system that is associated with a third party entity that is not aligned with the advertising network, the publisher, or the advertiser.

In some embodiments, a network interaction at an advertising network and a network interaction at a publisher are correlated to provide an assessment as to the legitimacy or fraudulence of the network interaction (e.g., a click).

FIG. 1 is a block diagram illustrating an embodiment of a system for analyzing a network interaction. In the example shown, computer 100 is used by a user for accessing a web page on server 106. In various embodiments, server 106 is associated with an advertising network or an advertiser. Computer 100 is able to communicate with network 102. In various embodiments, network 102 comprises one or more of the following: the Internet, a local area network, a wide area network, a wired network, a wireless network, or any other appropriate network. Server 106 can be accessed from network 102 via firewall 104 and local area network (LAN) 105. Edge appliance 108 is able to monitor traffic to and from server 106 and is connected to LAN 105. In various embodiments, monitoring comprises detecting in hardware the network traffic or the network interactions to be monitored, detecting in real-time network traffic, capturing data in real-time, analyzing data in real-time, triggering real-time queries or forensics of IP addresses/network topology/routing tables/preferred paths, detecting layer 3 through layer 7 data from the monitored traffic, monitoring Ethernet traffic, or any other appropriate monitoring of network traffic. Edge appliance 108 is able to store information on storage device 110. In some embodiments, edge appliance 108 monitors traffic to and from server 106 by being between server 106 and LAN 105 by receiving and forwarding all traffic between network 102 and server 106. In this situation, all traffic is received and forwarded without substantially affecting network traffic, without substantially affecting a transaction involving the network traffic, and/or with less than 2 milliseconds of delay for the process of receiving and forwarding.

In some embodiments, edge appliances can also be used to monitor traffic at other points in the network other than in front of or just beside a server—for example, on a trunk line, an internet service provider network, an advertising network, or any other appropriate traffic site.

Edge appliance 108 is able to communicate with model server 112. Edge appliance 108 periodically transmits reports and receives models from model server 112. Model server 112 can store information on storage device 114. Model server 112 forwards reports from edge appliance 108 to analytics server 116 and forwards models from analytics server 116 to edge appliance 108. In some embodiments, there are a plurality of model servers and a plurality of edge appliances, where an analytics server is able to support the communications with a plurality of model servers, and a model server is able to support the communications with a plurality of edge appliances. In some embodiments, scalability is achieved using a plurality of model servers.

Models are used by edge appliance 108 to calculate a preliminary score in real-time or quasi-real-time for detected network interactions. A preliminary score can be based on information associated with detected network interaction(s) as well as on stored parameters or models received from a model server or an analytics server such as model server 112 and analytics server 116, respectively.

Analytics server 116 stores report information to storage device 120 which acts as a data warehouse for the report information. Reports web server 122 can build reports based on the data stored in storage device 120. Network operations server 118 monitors the health and status of the system for analyzing network interactions including model server 112, analytics server 116, reports web server 122, and edge appliance 108. Network operations server 118 is able to communicate with each of the system hardware units including model server 112, analytics server 116, reports web server 122, and edge appliance 108 (in some cases directly or via the Internet with edge appliance 108 and in some cases via the Internet, through firewall 104, and via LAN 105).

In various embodiments, edge appliance 108 monitors network traffic on a local network that is separated from other networks (e.g., the Internet) by a firewall, receives network traffic from a local network and transmits the network traffic to a web server, receives network traffic from a local network that also transmits the network traffic to a web server, or receives network traffic from any other point or between any other two points appropriate for monitoring network traffic.

Figure 2:
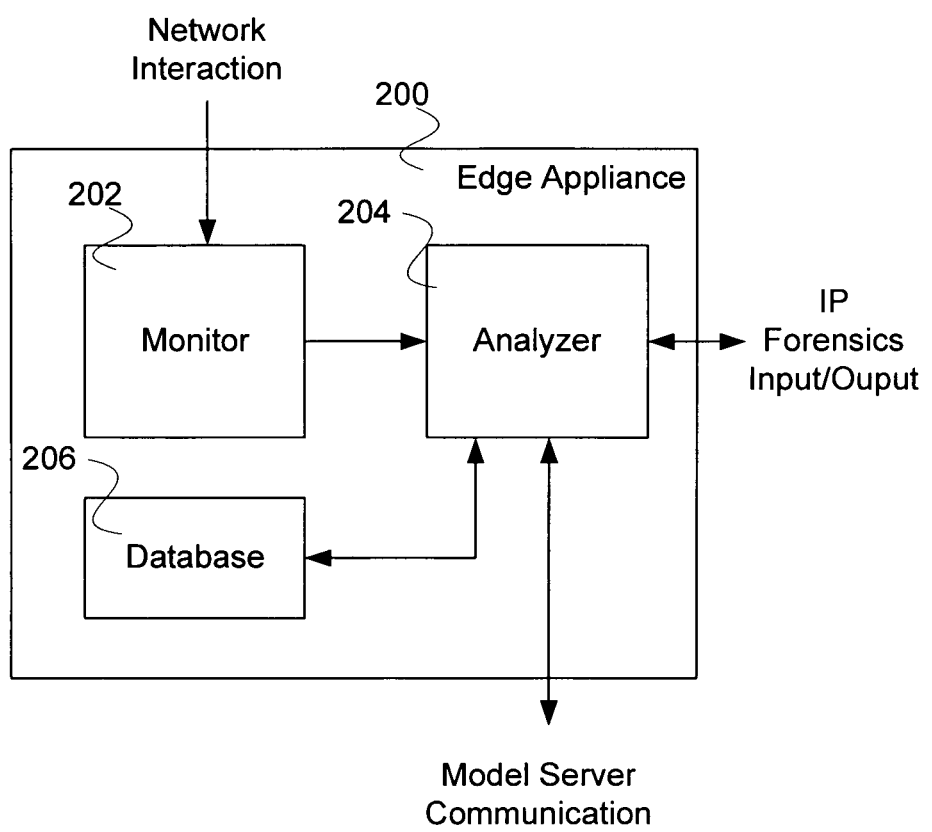
FIG. 2 is a block diagram illustrating software of an edge appliance in one embodiment.

FIG. 2 is a block diagram illustrating software of an edge appliance in one embodiment. In some embodiments, edge appliance 200 is used to implement edge appliance 108 of FIG. 1. In the example shown, edge appliance 200 includes monitor 202, analyzer 204, and database 206. Monitor 202 receives information regarding network interactions and/or network traffic and sends information to analyzer 204. Monitor 202 monitors information in real-time and Analyzer 204 can provide real-time or quasi-real-time assessment of information gathered by monitor 202. In some embodiments, monitor 202 receives information in real-time from edge appliance hardware that is detecting the network traffic to be monitored. Analyzer 204 analyzes network interactions and/or network traffic by examining TCP/IP or hypertext transfer protocol/secure hypertext transfer protocol (HTTP/HTTPS) layer information and uses that to make a preliminary scoring of the network interaction.

Preliminary scoring is based on models received from a model server and/or analytic server, and on other previously acquired network interaction information that is stored locally. Some models are specific in terms of scoring a network interaction—for example, a specific IP address is designated as scoring high because it was recently involved in a successful financial transaction or as scoring low because it was recently involved in sending significant amounts of spam and phishing email. Some models are generic in terms of scoring a network interaction—for example, an IP address that cannot be located with a probe immediately after being received in a click is designated as scoring low because it is likely fraudulent. Local edge appliance stored history can indicate that a large number of network interactions are coming from one particular IP address in a short period of time; Analyzer 204 can indicate that under these circumstances that these network interactions are designated with a low preliminary score. Models used in preliminary scoring of monitored network interactions can be updated locally by updating model parameters using local edge appliance network interaction data, updated from remote model and/or analytic servers either with new models or new model parameters, or any other appropriate manner of updating models for preliminary scoring.

Preliminary scoring or other analysis preformed by analyzer 204 can be real-time or in batch mode after a period of time. In some embodiments, monitoring and/or detection of a network interaction is done in real-time by edge appliance hardware. Extraction and capture of relevant network interaction information (e.g., layer 3 through layer 7 information) for analysis is performed in real-time. In some embodiments, preliminary scoring is provided to a user in real-time or quasi-real-time.

In various embodiments, the network interaction comprises a click, a cookie, or any other appropriate network interaction. Analyzer 204 is able to probe in real time the IP routing and perform forensics. Analyzer 204 can store network interaction and/or network traffic information in database 206. Analyzer 204 sends network interaction reports to model server and also receives from model server fraud model digests. The analytic server, such as analytic server 116, can calculate a final score for the network interaction based on information received at the analytic server. The final score is sent to a report server such as reports web server 122 of FIG. 1, from which a customer can access summarized legitimate and fraudulent network interactions.

Figure 3:
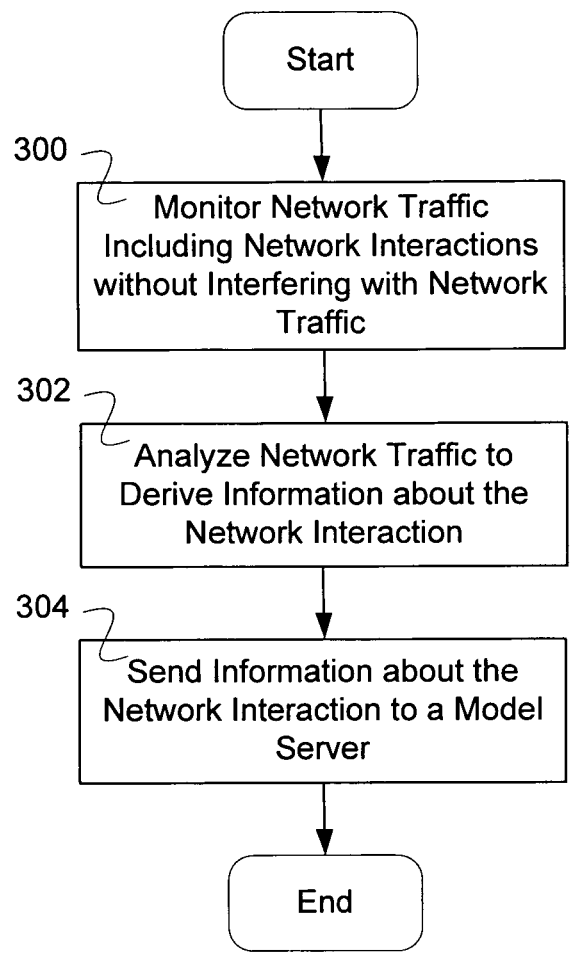
FIG. 3 is a flow diagram illustrating an embodiment of a process for analyzing network interactions.

FIG. 3 is a flow diagram illustrating an embodiment of a process for analyzing network interactions. In some embodiments, the process of FIG. 3 is implemented in edge appliance 200 of FIG. 2 or edge appliance 108 of FIG. 1. In the example shown, in 300 network traffic is monitored including network interactions without interfering with network traffic. In 302, network traffic is analyzed to derive information about the network interaction. In various embodiments, source and timing information are gleaned from the TCP/IP layer information. In 304, information is sent about the network interaction to a model server. In some embodiments, a click report or log is sent to a model server.

Analysis of network traffic is not limited to click type network interactions—email (e.g., simple mail transfer protocol interaction), file transfer protocol (FTP) traffic, telnet, entire page information traffic, instant messaging traffic, hypertext transfer protocol, or any other appropriate traffic can be analyzed to determine if IP addresses, routers, internet service providers (ISP's), users, or any other source or location along an Internet route is suspected of carrying or sourcing fraudulent click traffic.

Figure 4:
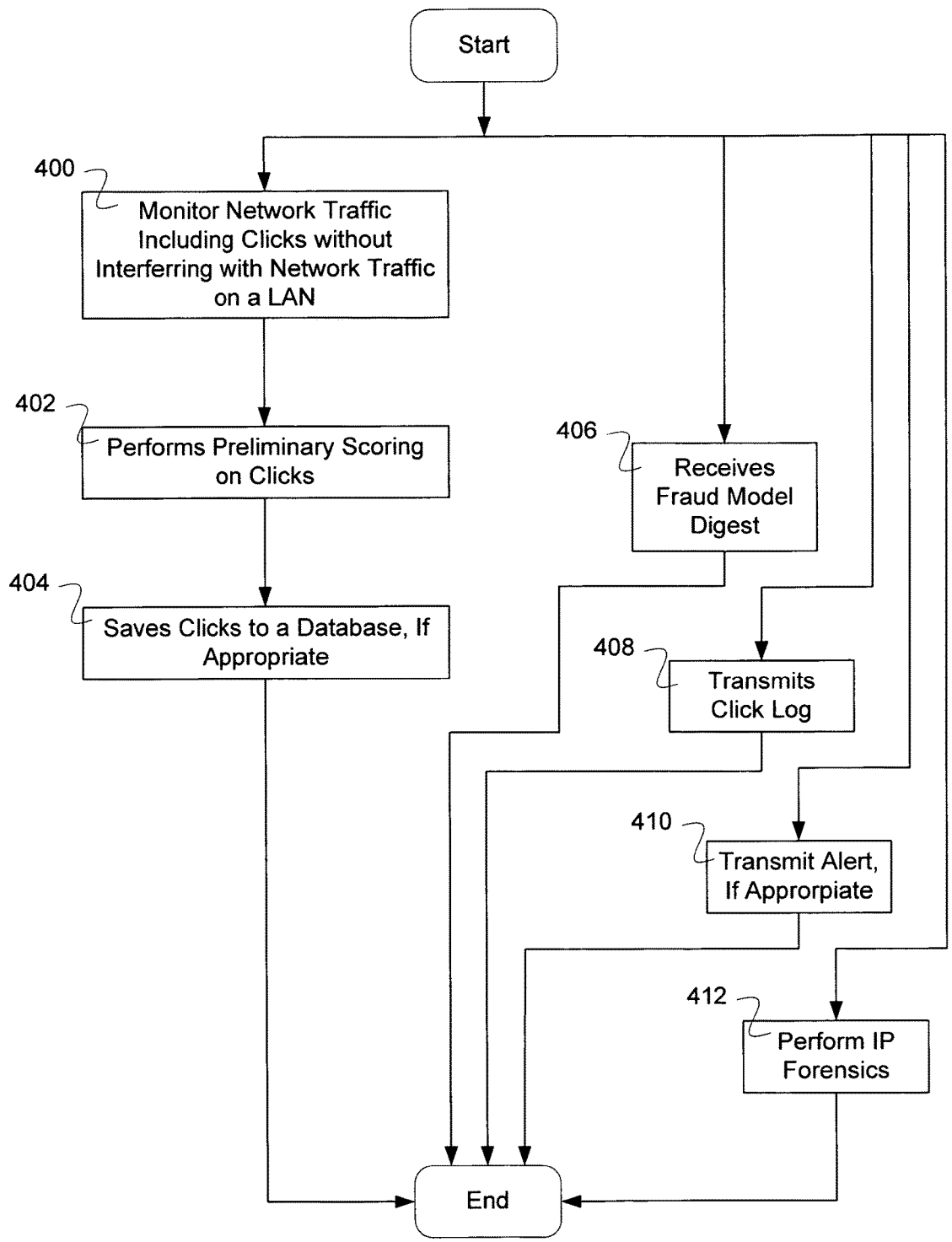
FIG. 4 is a flow diagram illustrating an embodiment of a process for analyzing network interactions.

FIG. 4 is a flow diagram illustrating an embodiment of a process for analyzing network interactions. In some embodiments, the process of FIG. 4 is implemented in edge appliance 200 of FIG. 2 or edge appliance 108 of FIG. 1. In the example shown, the processes of 400-402-404, 406, 408, 410, and 412 are run in parallel. In 400, network traffic including clicks is/are monitored without interfering with network traffic on a LAN. In 402, preliminary scoring is performed. In 404, clicks are saved to a database, if appropriate. Control passes to 400, if appropriate, or the process ends. In 406, fraud model digest is received. In 408, click log is transmitted. In 410, an alert is transmitted if appropriate. In various embodiments, alerts are transmitted using email, pagers, short message service (SMS), simple network management protocol (SNMP), or any other appropriate way to alert. Alerts may be triggered if a user settable threshold is surpassed—for example high click velocity (i.e., click rate), or high uniform resource locator (URL) velocity (i.e., URL change rate). In 412, IP forensics are performed. In some embodiments, an IP forensic or other active probe is performed in response to receiving a network interaction which satisfies a criterion or set of criteria. The triggering criterion or criteria could be any suspicious characteristic of an incoming network interaction or a sampling criterion that enables the edge appliance to statistically, or otherwise, sample network interactions. IP forensics refers to sampled or full probing of the network. IP forensics is based at least in part on the capture of border gateway protocol routing tables to help to analyze how the click or network interaction arrived at the monitoring edge appliance. IP forensics can also perform network veracity checks (e.g., probing network, in real-time or non-real time, to check a route back for a received click). In various embodiments, core routing, point of departure, Internet entry, detection of onion routing, honeynet data, detecting use of bot networks, and/or anonymous proxy data are assessed during IP forensics.

Figure 5:
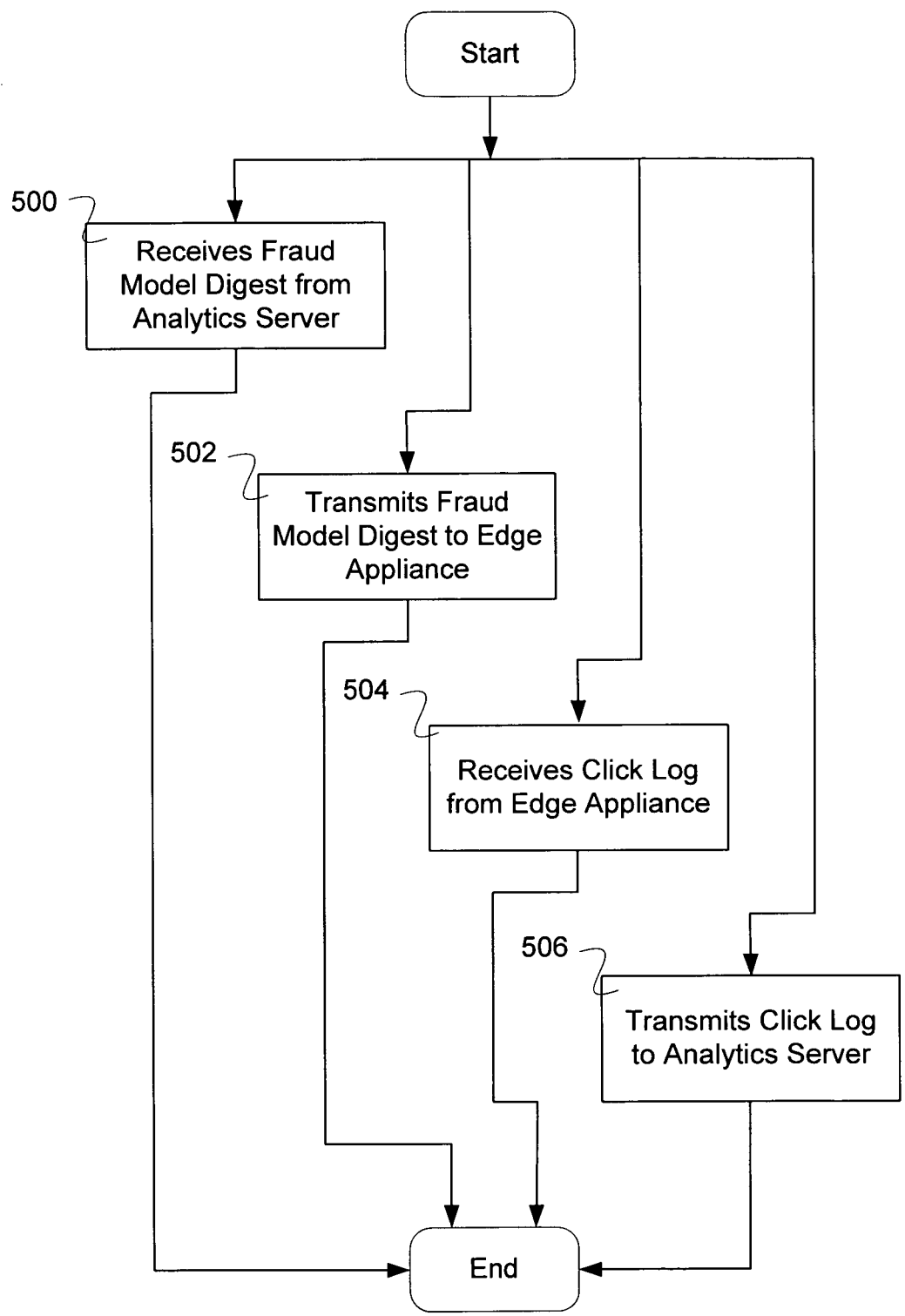
FIG. 5 is a flow diagram illustrating an embodiment of a process for analyzing network interactions.

FIG. 5 is a flow diagram illustrating an embodiment of a process for analyzing network interactions. In some embodiments, the process of FIG. 5 is implemented in model server 112 of FIG. 1. In the example shown, the processes 500, 502, 504, and 506 are run in parallel. In 500 a fraud model digest is received from an analytics server. In 502, the fraud model digest is transmitted to an edge appliance. In 504, a click log is received form an edge appliance. In 506, the click log is transmitted to an analytics server. In some embodiments, there is a plurality of edge appliances that are supported by a model server. In some embodiments, there is a plurality of model servers supported by an analytics server. In some embodiments, the model server supports the scalability of the system for analyzing network interactions.

In some embodiments, click logs and fraud digests are compressed. In some embodiments, click logs, fraud digests, and any other communications between analyzer system components are securely transmitted using encryption or other secure transmission method.

Figure 6:
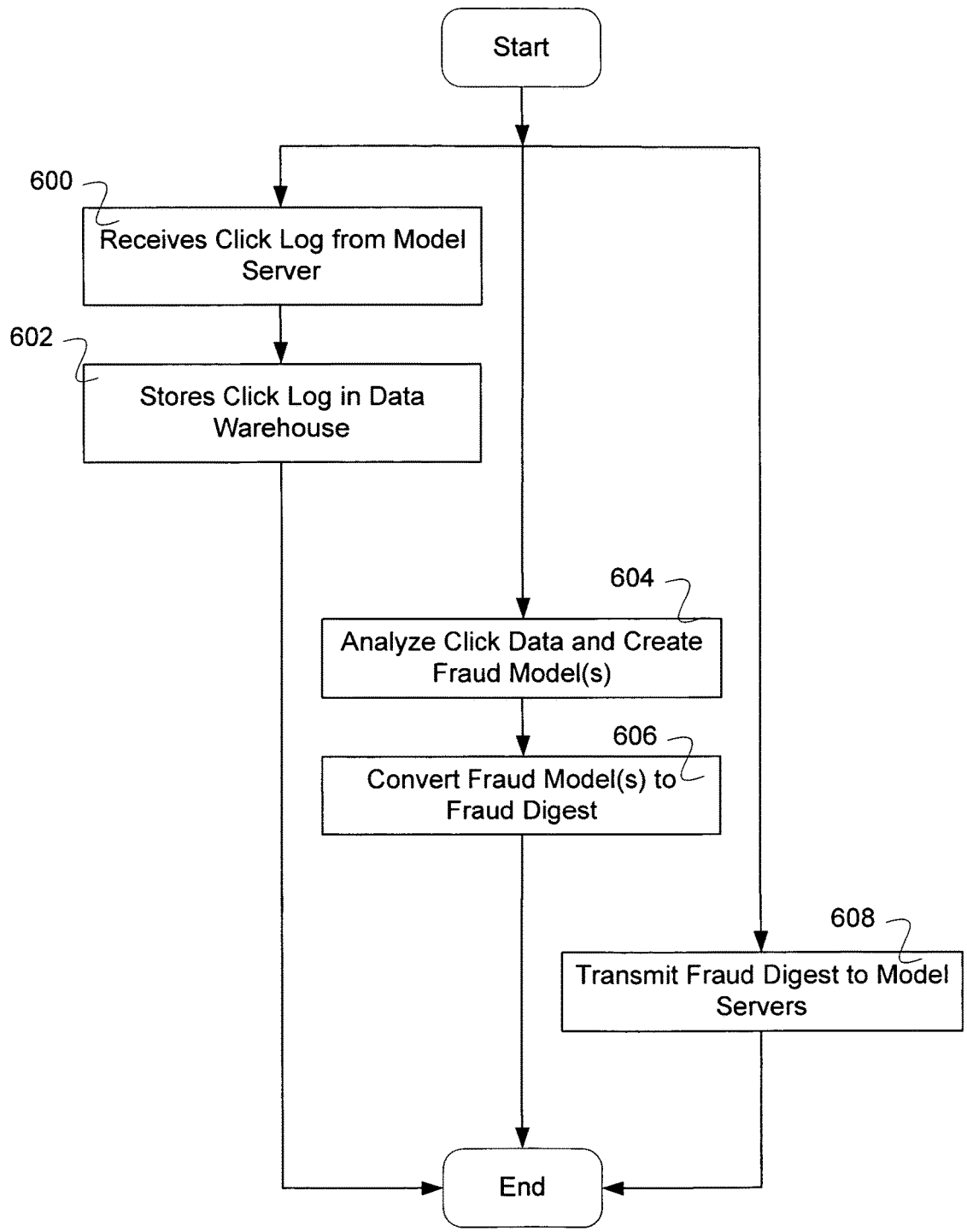
FIG. 6 is a flow diagram illustrating an embodiment of a process for analyzing network interactions.

FIG. 6 is a flow diagram illustrating an embodiment of a process for analyzing network interactions. In some embodiments, the process of FIG. 6 is implemented in analytics server 116 of FIG. 1. In the example shown, the processes 600-602, 604-606, and 608 are run in parallel. In 600, a click log is received from a model server. In 602, the click log is stored in a data warehouse. Control passes to 600, if appropriate, or the process ends. In 604, click data is analyzed and one or more fraud models are created. In 606, the fraud model(s) is/are converted to a fraud digest. Control passes to 604, if appropriate, or the process ends. In 608, the fraud digest is transmitted to model servers.

Figure 7:
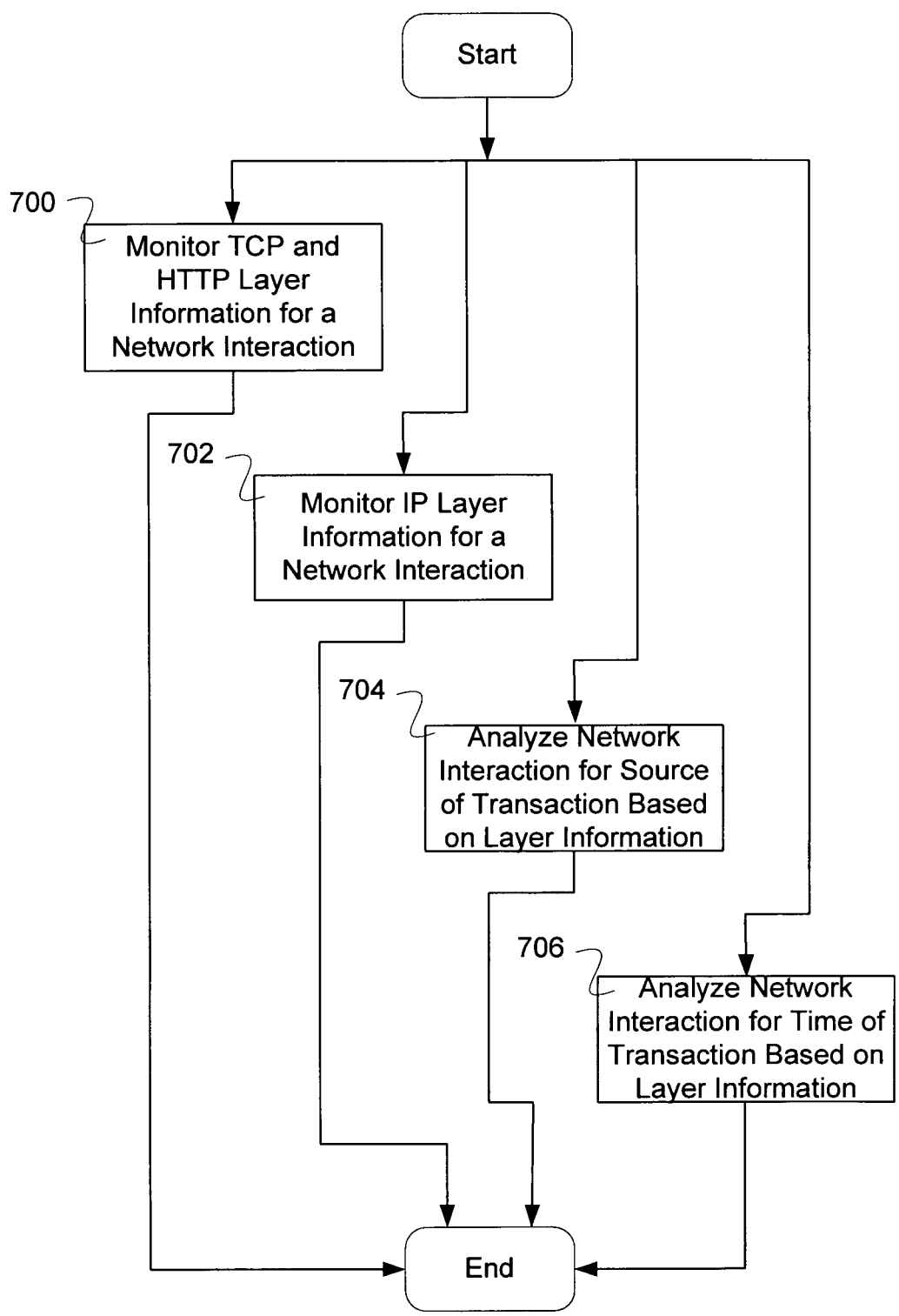
FIG. 7 is a flow diagram illustrating a process for analyzing network interactions.

FIG. 7 is a flow diagram illustrating a process for analyzing network interactions. In some embodiments, the process of FIG. 7 is implemented in analytics server 116 of FIG. 1. In some embodiments, the process of FIG. 7 is used to analyze click data in 604 of FIG. 6. In the example shown, the processes of 700, 702, 704, and 706 are run in parallel. In 700, TCP and HTTP layer information are monitored for a network interaction. In 702, IP layer information is monitored for a network interaction. In 704, the network interaction is analyzed for the source of the transaction based on layer information. In 706, the network interaction is analyzed for the time of transaction based on layer information.

Figure 8:
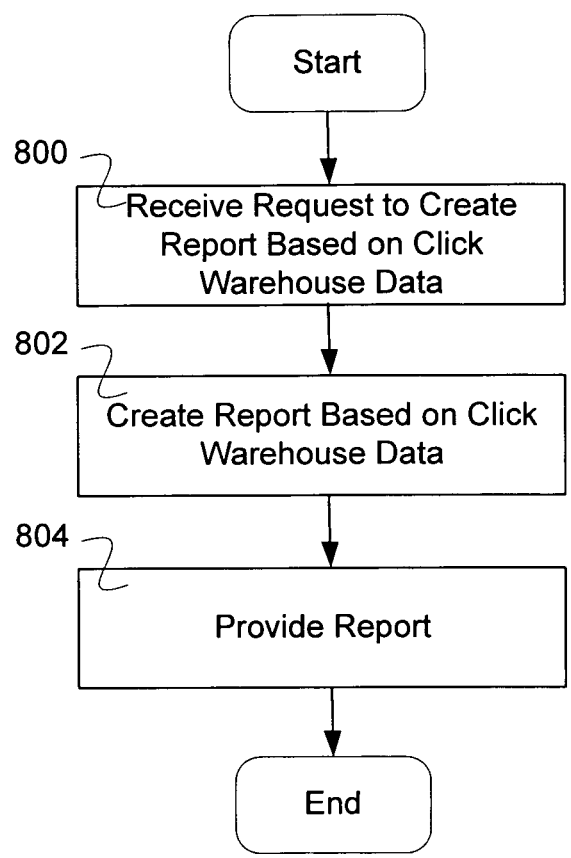
FIG. 8 is a flow diagram illustrating an embodiment of a process for analyzing a network interaction.

FIG. 8 is a flow diagram illustrating an embodiment of a process for analyzing a network interaction. In some embodiments, the process of FIG. 8 is implemented on reports web server 122 of FIG. 1. In the example shown, in 800 a request is received to create a report based on click warehouse data. In 802, a report is created based on the click warehouse data. In 804, the report is provided.

Reports can be provided over any date range and can be one or more of the following: per customer (e.g., Ford), per domain (e.g., mustang.ford.com), per keyword, per uniform resource locator (URL) (e.g., ford.com/promo2567.html), per URL group, or any other appropriate break down. Reports can also provide number of clicks, percentage of valid clicks, percentage of invalid clicks, per click information (e.g., IP, timestamp, click score, score reason, URL, referrer URL, user-agent, etc.). In some embodiments, reports are provided on a regular basis automatically.

Figure 9:
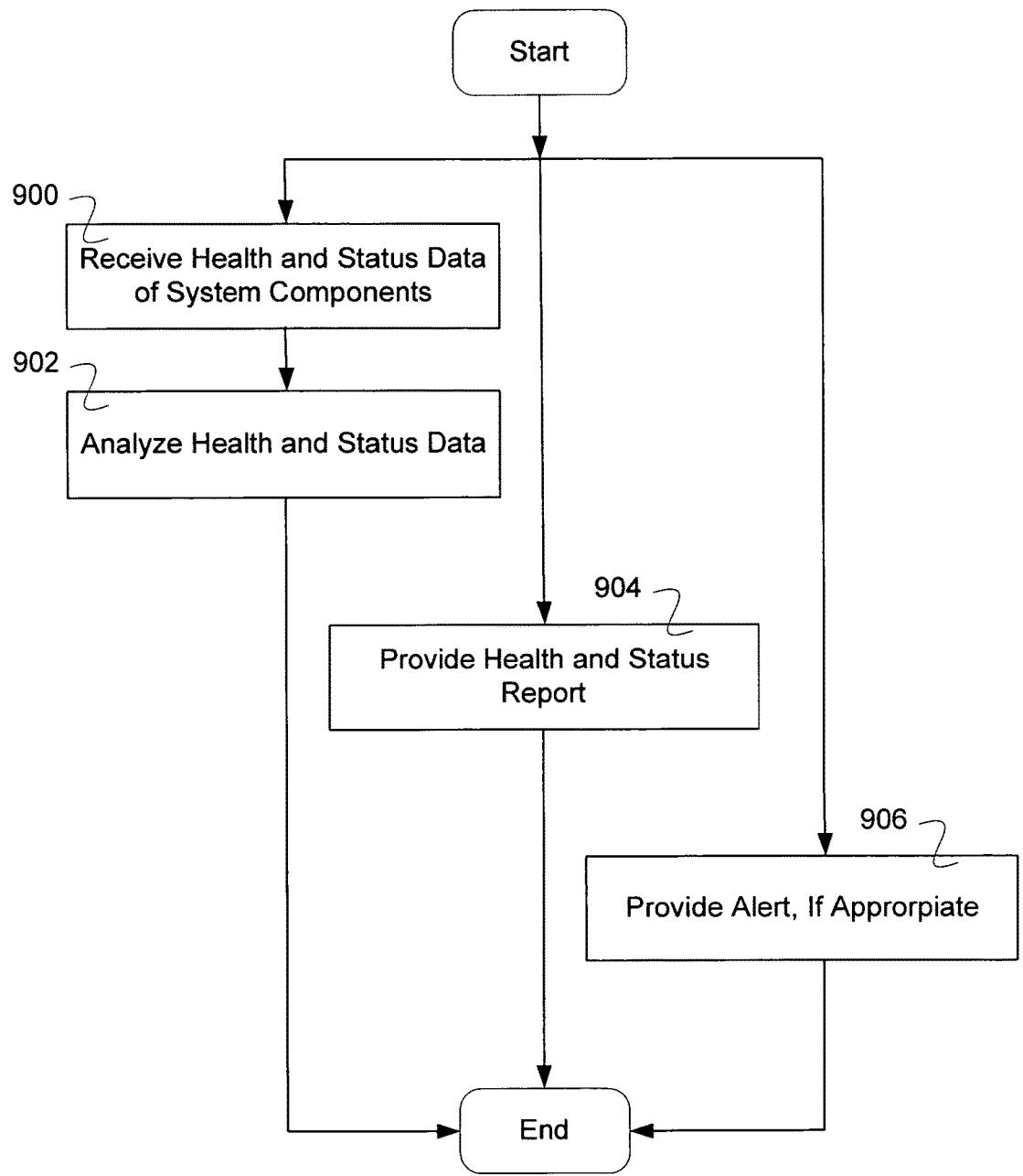
FIG. 9 is a flow diagram illustrating an embodiment of a process for analyzing a network interaction.

FIG. 9 is a flow diagram illustrating an embodiment of a process for analyzing a network interaction. In some embodiments, the process of FIG. 9 is implemented on network operations server 118 of FIG. 1. In the example shown, the processes 900-902, 904, and 906 are run in parallel. In 900, health and status data is received from system components. In 902, the health and status data is analyzed. Control passes to 900, if appropriate, or the process ends. In 904, a health and status report is provided. In 906, an alert is provided, if appropriate. For example, health and status data may indicate that a certain component for analyzing network interactions is overloaded or malfunctioning, and alert would then be sent to inform a system administrator or other relevant party to address the overload or malfunction.

Figure 10:
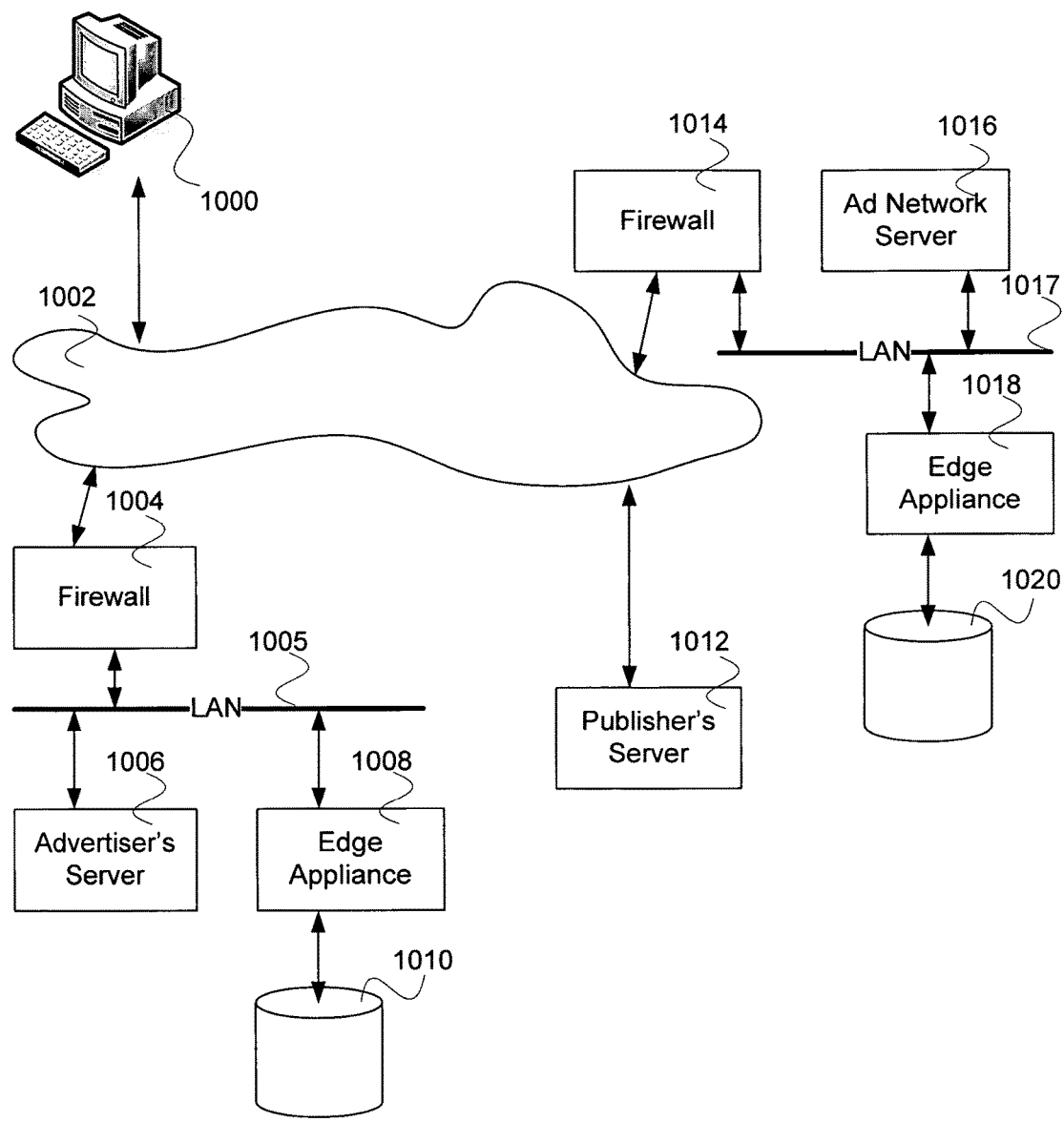
FIG. 10 is a block diagram illustrating an embodiment of a system for analyzing a network interaction.

FIG. 10 is a block diagram illustrating an embodiment of a system for analyzing a network interaction. In the example shown, personal computer 1000 is used by a user to navigate to a publisher's web site hosted by publisher's server 1012. Personal computer 1000 is able to communicate with publisher's server 1012 via network 1002. In various embodiments, network 1002 comprises one or more of the following: the Internet, a local area network, a wide area network, a wired network, a wireless network, an internet service provider, or any other appropriate network. The user of personal computer 1000 can click on an advertisement published on publisher's web site and is sent to ad network server 1016. Ad network server 1016 can communicate to and from network 1002 via LAN 1017 and firewall 1014. Edge appliance 1018 monitors network interactions to and from ad network server 1016 via LAN 1017. Edge appliance 1018 can store information on storage device 1020. In some embodiments, edge appliance 1018 is placed between ad network server 1016 and LAN 1017 and monitors by receiving and forwarding network traffic.

When sent to ad network server 1016 after clicking on an advertisement, ad network server 1016 redirects the user to an advertiser's site hosted by advertiser's server 1006. Advertiser's server 1006 can communicate with personal computer 1000 via network 1002, firewall 1004, and LAN 1005. Edge appliance 1008 monitors network traffic to and from advertiser's server 1006 via LAN 1005. Edge appliance 1008 can store information on storage device 1010. In some embodiments, edge appliance 1008 can monitor network traffic to and from advertiser's server 1006 by being placed between advertiser's server 1006 and LAN 1005.

Network interaction information from edge appliance 1008 and 1018 can be used to assess if the interactions are correlated. In some embodiments, the network interaction information can be used to assess or account for clicks and redirects that should be reimbursed or paid for by the advertiser to the ad network or from the ad network to the publisher.

In some embodiments, the publisher is one of a plurality of publishers being analyzed. In some embodiments, the advertising network is one of a plurality of advertising networks being analyzed. In some embodiments, the network interaction analysis is performed by a third party that is not affiliated with the advertising network or the publisher. In various embodiments, a third party that is not affiliated with an entity comprises one or more of the following: a third party that is not at all owned or under the influence of the entity, a third party that is not controlled by the entity, a third party that is not under management control of the entity, a third party that is not majority owned by the entity, or any other definition allowing independence of analysis by the third party.

Figure 11:
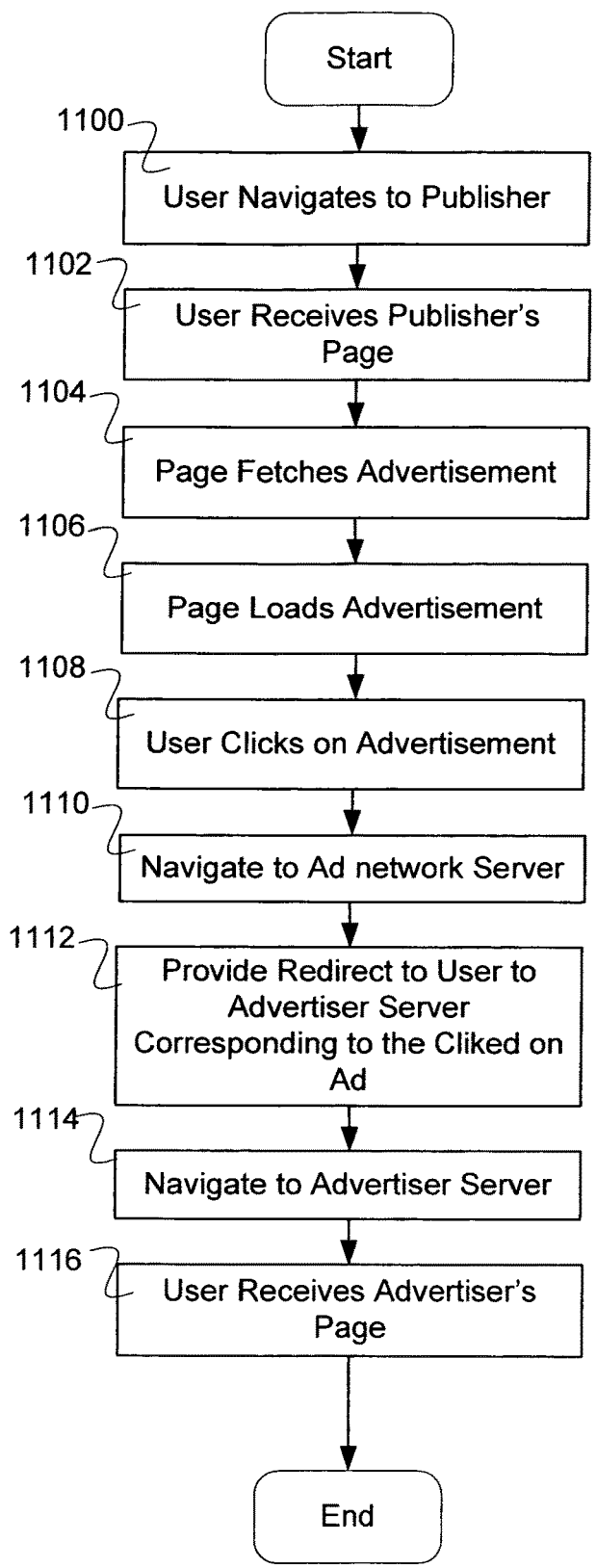
FIG. 11 is a flow diagram illustrating an embodiment of a process for network interaction.

FIG. 11 is a flow diagram illustrating an embodiment of a process for network interaction. In some embodiments, the process of FIG. 11 is executed on the system of FIG. 10. In the example shown, in 1100 a user navigates to a publisher. In 1102, the user receives a publisher's page. In 1104, the page fetches an advertisement, typically from the ad network's server. In 1106, the page loads the advertisement. In 1108, the user clicks on the advertisement. In 1110, the user is navigated to an ad network server. In 1112, the ad network provides a redirect to the user to an advertiser server corresponding to the clicked on advertisement. In 1114, the user is navigated to the advertiser server. In 1116, the user receives the advertiser's page.

Figure 12:
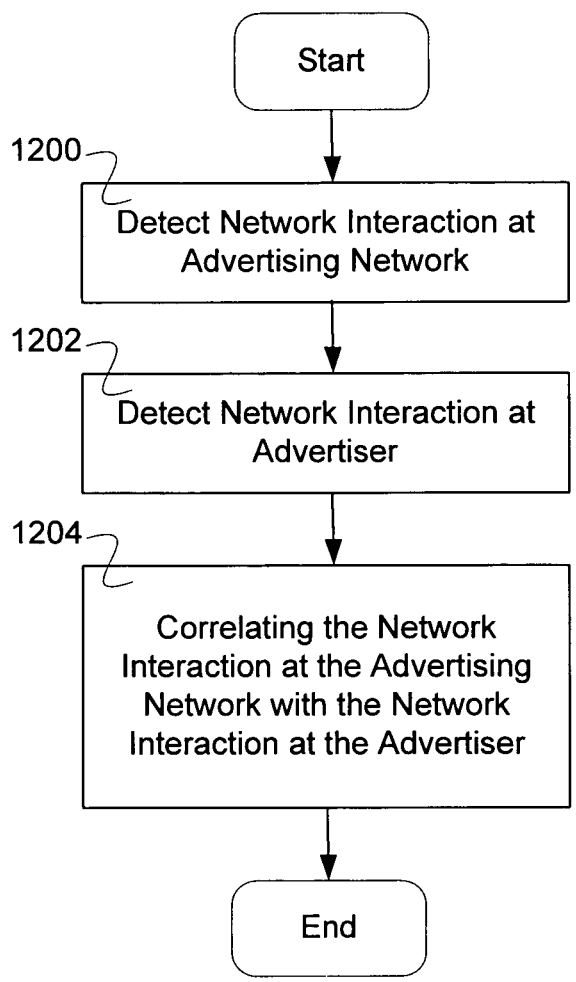
FIG. 12 is a flow diagram illustrating an embodiment of a process for analyzing a network interaction.

FIG. 12 is a flow diagram illustrating an embodiment of a process for analyzing a network interaction. In some embodiments, the process of FIG. 12 is used to analyze network interactions of the system of FIG. 10. In the example shown, in 1200 a network interaction is detected at an advertising network. In some embodiments, the network interaction at the advertising network comprises one of the following: a click received at a publisher that directs a user to the advertising network or a redirect from a publisher to an advertiser's site corresponding to the advertisement clicked on at the publisher. In 1202, a network interaction is detected at an advertiser. In some embodiments, the network interaction at the advertiser comprises navigating to the advertiser's site. In 1204, the network interaction at the advertising network is correlated with the network interaction at the advertiser. In some embodiments, the correlation is based at least in part on a time of the network interaction at the advertising network and a time of the network interaction at the advertiser. In various embodiments, the correlation is used for one of the following: to assess if the network interaction at the advertising network is legitimate, to assess if the network interaction at the advertiser is legitimate, and/or to assess if a network interaction at a publisher is legitimate.

In various embodiments, the advertising network is one of a plurality of advertising networks being analyzed, the advertiser is one of a plurality of advertisers being analyzed, and/or the network interaction analysis is performed by a third party that is not affiliated with the advertising network or the advertiser.

In some embodiments, the correlation is performed in one of the following: real-time, quasi-real-time, or batch mode. In various embodiments, detecting a network interaction at the advertising network uses an appliance or detecting the network interaction at the advertiser uses an appliance. For example, an appliance capable of real-time, quasi-real-time, or batch analysis of a network interaction is placed such that network traffic is monitored by the appliance on a local network at an advertiser or at an advertising network. In some embodiments, the appliance is able to probe the network—for example, IP addresses, routes in the network, or any other useful probe for determining network interaction legitimacy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of assessing an interaction legitimacy, the method comprising:
   monitoring, at a first appliance, network interactions associated with an advertising server that is separate from the first appliance and related to an advertisement associated with a publisher website;
   receiving, at the first appliance, first network interaction information associated with a click received at the publisher website that directs a user to the advertising network server, the first network interaction information comprising a time at which the first network interaction occurred;
   sending the first network interaction information to an analytics server;
   monitoring, at a second appliance different from the first appliance, network interactions associated with the advertiser server that is separate from the second appliance and related to the advertisement associated with the publisher website;
   receiving, at the second appliance, second network interaction information associated with a navigation to the advertiser server caused by a redirect from the advertising network server to the advertiser server, the second network interaction information comprising a time at which the second network interaction occurred;

sending the second network interaction information to the analytics server;

determining, using a processor at the analytics server, a correlation between the first network interaction and the second network interaction, the correlation:

indicating that the first network interaction and the second network interaction are caused by the same interaction between the user and the advertisement; and being based on the time at which the first network interaction occurred and the time at which the second network interaction occurred; and assessing the interaction legitimacy based on the correlation.

2. The method as in claim 1, wherein the first network interaction comprises a redirect from the publisher website to an advertiser website.

3. The method as in claim 1, wherein assessing the interaction legitimacy based on the correlation comprises using the correlation to assess one or more of the following: whether the first network interaction is legitimate and whether the second network interaction is legitimate.

4. A computer program product for assessing an interaction legitimacy, the computer program product being embodied in a non-transitory computer readable medium and comprising computer instructions for:

monitoring, at a first appliance, network interactions associated with an advertising server that is separate from the first appliance and related to an advertisement associated with a publisher website;

receiving, at the first appliance, first network interaction information associated with a click received at the publisher website that directs a user to the advertising network server, the first network interaction information comprising a time at which the first network interaction occurred;

sending the first network interaction information to an analytics server;

monitoring, at a second appliance different from the first appliance, network interactions associated with the advertiser server that is separate from the second appliance and related to the advertisement associated with the publisher website;

receiving, at the second appliance, second network interaction information associated with a navigation to the advertiser server caused by a redirect from the advertising network server to the advertiser server, the second network interaction information comprising a time at which the second network interaction occurred;

sending the second network interaction information to the analytics server;

determining, using a processor at the analytics server, a correlation between the first network interaction and the second network interaction, the correlation:

indicating that the first network interaction and the second network interaction are caused by the same interaction between the user and the advertisement; and being based on the time at which the first network interaction occurred and the time at which the second network interaction occurred; and assessing the interaction legitimacy based on the correlation.

5. A system for assessing an interaction legitimacy, comprising:

a first appliance comprising:
one or more processors; and
one or more computer-readable non-transitory media, wherein the one or more computer-readable non-transitory media contain instructions stored thereon that, when executed by the one or more processors, cause the one or more processors to perform operations comprising:

monitoring network interactions associated with an advertising server that is separate from the first appliance and related to an advertisement associated with a publisher website;

receiving, at the first appliance, first network interaction information associated with a click received at the publisher website that directs a user to the advertising network server, the first network interaction information comprising a time at which the first network interaction occurred; and sending the first network interaction information to an analytics server;

a second appliance, different from the first appliance, comprising:
one or more processors; and
one or more computer-readable non-transitory media, wherein the one or more computer-readable non-transitory media contain instructions stored thereon that, when executed by the one or more processors, cause the one or more processors to perform operations comprising:

monitoring network interactions associated with the advertiser server that is separate from the second appliance and related to the advertisement associated with the publisher website;

receiving, at the second appliance, second network interaction information associated with a navigation to the advertiser server caused by a redirect from the advertising network server to the advertiser server, the second network interaction information comprising a time at which the second network interaction occurred; and sending the second network interaction information associated with the advertiser server to the analytics server; and the analytics server comprising:
one or more processors; and
one or more computer-readable non-transitory media, wherein the one or more computer-readable non-transitory media contain instructions stored thereon that, when executed by the one or more processors, cause the one or more processors to perform operations comprising:

determining, using a processor at the analytics server, a correlation between the first network interaction and the second network interaction, the correlation:

indicating that the first network interaction and the second network interaction are caused by the same interaction between the user and the advertisement; and being based on the time at which the first network interaction occurred and the time at which the second network interaction occurred; and assessing the interaction legitimacy based on the correlation.

6. The system as in claim 5, wherein the first network interaction comprises a redirect from the publisher website to an advertiser website.

7. The system as in claim 6, wherein the advertiser website corresponds to the advertisement clicked on at the publisher website.

8. The system as in claim 5, wherein the advertising network server is one of a plurality of advertising network servers.

9. The system as in claim 5, wherein the advertiser server is one of a plurality of advertiser servers.

10. The system as in claim 5, wherein assessing the interaction legitimacy based on the correlation comprises using the correlation to assess if the interaction associated with the advertising network server is legitimate.

11. The system as in claim 5, wherein assessing the interaction legitimacy based on the correlation comprises using the correlation to assess if the interaction associated with the advertiser server is legitimate.

12. The system as in claim 5, wherein assessing the interaction legitimacy based on the correlation comprises using the correlation to assess if the interaction associated with the publisher website is legitimate.

13. The system as in claim 5, wherein the correlation is used to distinguish whether the second network interaction is a qualified network interaction with a user.

14. The method as in claim 1, further comprising:
indicating that the first network interaction is legitimate based on the correlation.

15. The method as in claim 1, further comprising:
indicating that the second network interaction is legitimate based on the correlation.

16. The method as in claim 2, wherein the advertiser website corresponds to the advertisement clicked on at the publisher website.

17. The computer program product as in claim 4, wherein the first network interaction comprises a redirect from the publisher website to an advertiser website.

18. The computer program product as in claim 17, wherein the advertiser website corresponds to the advertisement clicked on at the publisher website.

19. The method as in claim 1, wherein the correlation is used to distinguish whether the second network interaction is a qualified network interaction with a user.

20. The computer program product as in claim 4, wherein the correlation is used to distinguish whether the second network interaction is a qualified network interaction with a user.

* * * * *